US008477586B2

(12) United States Patent
Okamoto

(10) Patent No.: US 8,477,586 B2
(45) Date of Patent: Jul. 2, 2013

(54) METHOD FOR DRIVING OPTICAL PICKUP APPARATUS

(75) Inventor: Takayuki Okamoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/366,459

(22) Filed: Feb. 6, 2012

(65) Prior Publication Data

US 2012/0201115 A1 Aug. 9, 2012

(30) Foreign Application Priority Data

Feb. 7, 2011 (JP) ................................. 2011-024431

(51) Int. Cl.
*G11B 7/00* (2006.01)

(52) U.S. Cl.
USPC ............... 369/112.23; 369/44.32; 369/112.05

(58) Field of Classification Search
USPC .............................. 369/44.32, 112.05, 112.23
See application file for complete search history.

(56) References Cited

U.S. PATENT DOCUMENTS

| | | | | |
|---|---|---|---|---|
| 5,966,248 A * | 10/1999 | Kurokawa et al. | ............ | 359/697 |
| 6,501,604 B2 * | 12/2002 | Onda | ............. | 359/696 |
| 6,599,035 B2 * | 7/2003 | Ichinokawa | ................... | 396/349 |
| 6,714,357 B2 * | 3/2004 | Yamazaki | ...................... | 359/696 |
| 6,813,441 B2 * | 11/2004 | Yamazaki | ........................ | 396/82 |
| 7,099,088 B2 * | 8/2006 | Okuda | ........................... | 359/696 |
| 7,486,452 B2 * | 2/2009 | Kinoshita et al. | ............. | 359/813 |
| 7,576,931 B2 * | 8/2009 | Ishimasa et al. | ............... | 359/822 |
| 7,630,152 B1 * | 12/2009 | Inata et al. | ..................... | 359/823 |
| 2007/0253309 A1 * | 11/2007 | Maruyama | ............... | 369/112.01 |
| 2009/0249901 A1 * | 10/2009 | Tsuchiya | ........................... | 74/24 |

FOREIGN PATENT DOCUMENTS

| EP | 1 351 127 A2 | 10/2003 |
|---|---|---|
| JP | 2008-293601 A | 12/2008 |
| JP | 2009-104668 A | 5/2009 |

* cited by examiner

*Primary Examiner* — Wayne Young
*Assistant Examiner* — Brenda Bernardi
(74) *Attorney, Agent, or Firm* — Keating & Bennett, LLP

(57) ABSTRACT

A method for driving an optical pickup apparatus which improves the durability of components that drive a movable lens that moves back and forth between an original position and a drive-limit position and achieves stable operability and an extended lifetime of the optical pickup apparatus performs a first step-drive in which a movable lens moves to an original-restoration start position by being driven a specified distance toward a drive-limit position, a second step-drive in which the movable lens thereafter moves to an original position by being driven toward the original position a distance equivalent to the distance from the drive-limit position to the original position, and a third step-drive in which the movable lens thereafter moves to a default position by being driven a specified distance.

7 Claims, 3 Drawing Sheets

METHOD FOR DRIVING OPTICAL PICKUP APPARATUS

BACKGROUND OF THE INVENTION

1. Field of the Invention

The present invention relates to a method for driving an optical pickup apparatus that irradiates an optical disc with laser light to record or playback data.

2. Description of the Related Art

As disc-shaped recording media, many types of optical disc such as a compact disc (CD), a digital versatile disc (DVD), a high-density DVD (HD-DVD) and a Blu-ray Disc have been put into practical use in the past. With these types of optical discs, the wavelength of laser light used, the depth of the transparent layers extending down to the recording layer, and the like differ, so a single or a plurality of objective lenses are used to handle a plurality of types of optical disc.

Furthermore, an optical pickup apparatus is used which irradiates an optical disc with laser light to record or playback data. The optical pickup apparatus is equipped with an objective lens that focuses laser light at a spot on the signal recording layer of the optical disc.

Therefore, focus servo control to focus the light beam from the light source through the objective lens onto the recording layer of the optical disc and tracking servo control to track and scan at the fine track pitch of the optical disc are performed.

Moreover, in order to align the focus of the light beam on a specified recording layer, the focus error signals (FE signals) obtained in the light reflected from the optical disc are observed while moving the objective lens in the focus direction using an actuator to move the focus of the light beam emitted from the light source and emanating from the objective lens in the focus direction, thereby performing a focus search to detect the position at which the focus of the light beam coincides with the recording layer of the optical disc.

In addition, during a focus servo control operation to align the focus of the light beam on a different recording layer, S-shaped waveforms appearing in the FE signals are detected at the time that the focus of the light beam passes through the surface and recording layer, respectively, of the optical disc. Furthermore, the position at which the focus of the light beam coincides with the recording layer is detected based on the S-shaped waveform corresponding to the recording layer of the optical disc. Moreover, the substrate thickness, the protective layer thickness, and the number of recording layers of the optical disc are detected based on the detection time differences among the various S-shaped waveforms corresponding to the surface and recording layers of the optical disc.

Furthermore, there are also known spherical aberration compensation mechanisms which perform compensation of spherical aberrations by moving along the direction of the optical axis a luminous flux-changing movable lens (collimating lens, expander lens, or the like) that changes the convergence and scattering state of the luminous flux incident upon the object lens, thus adjusting the convergence and scattering state of the laser light passing through these lenses. Moreover, in a multilayer optical disc in which a plurality of recording layers are laminated, spherical aberration is generated due to the distance between recording layers, such that optimal spherical aberration compensation is generally performed for each surface when performing servo control for each recording layer.

To this end, after moving a collimating lens from an original position to a specified position and performing the spherical aberration compensation corresponding to the specified recording layer, the objective lens is moved in the focusing direction while counting the number of S-shaped waveforms appearing in the FE signal to perform the focus servo control for the target recording layer.

In order to move the collimating lens from the original position to the specified position, the collimating lens is moved to the specified position by driving a stepper motor a specified number of pulses after confirming that the collimating lens is in the original position, or after temporarily returning the collimating lens to the original position, for instance.

In addition, an optical pickup apparatus has been proposed which is designed to detect a reference position of the collimating lens by providing an optical detector that receives a portion of the light beam passing through the collimating lens and utilizing changes in the detection situation of this optical detector (see, for example, Japanese Patent Application Laid-Open Publication No. 2008-293601).

In the case of temporarily returning the collimating lens to the original position and then moving the collimating lens to the specified position, in order to make restoration to the original position possible regardless of the position of the collimating lens, the stepper motor that can be driven back and forth between the original position and the drive-limit position is driven by the number of pulses required to return the collimating lens from the drive-limit position to the original position.

To do this, a nut made of plastic is installed so as to be movable by being threaded onto the screw shaft that is rotary-driven by the stepper motor and which allows gear-tooth skipping and disengaged rotation in a state of contact with a specified stopping member, and the nut is moved along the screw shaft to move the collimating lens.

Furthermore, in order to prevent the phenomenon of locking of the nut when it exceeds its movement limit, an optical disc device has been proposed in which the nut is split to adopt a structure with its diameter being capable of enlarging or shrinking, and a tapered member is caused to contact with the nut at the end portion of movement, thereby enlarging the nut diameter (see, for example, Japanese Patent Application Laid-Open Publication No. 2009-104668).

SUMMARY OF THE INVENTION

When a movable lens for changing the luminous flux such as a collimating lens is moved back and forth in the direction of the optical axis, with the interposition of a nut threaded onto a screw shaft that is rotary-driven by a stepper motor, the movable lens can be halted at a specified position by controlling the number of steps by which the stepper motor is driven. Moreover, stopping members, sensors, and the like provided at specified positions can be used to halt the movable lens at the specified position.

In addition, with a constitution in which the split nut or the like described in Japanese Patent Application Laid-Open Publication No. 2009-104668 is used to permit gear-tooth skipping, or with a constitution in which small-diameter unthreaded members are provided at both end portions of the screw shaft, with the stopping positions being provided in these portions, and in which disengaged rotation is permitted in the state of being urged toward the threaded portions via urging members such as a coil spring and a leaf spring, it is possible to forcibly halt the screw shaft while it is rotary-driven and to halt accurately at the specified positions. However, if the screw shaft is halted via a stopping member or urging member while it is rotating, there is a risk of wearing the surfaces that contact rotating portions such as the threaded portions or shaft portions at the time of gear tooth-skipping or disengaged rotating (hereinafter referred to collectively as "gear tooth-skipping"), so this poses a problem.

In particular, in cases where the screw shaft is made of metal and the nut is made of plastic, if the number of the gear tooth-skipping revolutions becomes large, a problem arises in that the nut made of plastic becomes worn, thus having a deleterious effect on the lifetime of the optical pickup apparatus. Therefore, in order to improve the durability of the driving components of the optical pickup apparatus and thus obtain a reliable product lifetime, even with a structure that permits stopping with the nut in the gear tooth-skipping state, or even with a structure in which the position is fixed via an urging member, it is desirable to reduce the number of gear tooth-skipping revolutions as much as possible.

In addition, in order to obtain stable operability, it is preferable that the default position serving as the reference position for the start of driving of the movable lens be located at a position different from the original position where gear tooth-skipping occurs, and in order to accurately halt the movable lens at this default position, it is preferable that the movable lens be temporarily returned to the original position and then moved to the preset default position.

In view of the aforementioned problems, preferred embodiments of the present invention provide a method for driving an optical pickup apparatus which improves the durability of components that drive a movable lens that moves back and forth between an original position and a drive-limit position and which can therefore achieve stable operability and lengthen the lifetime of the optical pickup apparatus.

According to a preferred embodiment of the present invention, a method for driving an optical pickup apparatus that irradiates an optical disc with laser light to record or playback data, while compensating for spherical aberration by moving a movable lens in a direction of an optical axis to change a luminous flux provided within an optical path between a laser diode and an objective lens, the method including the steps of moving the movable lens via a lens driving device back and forth between a preset original position and a drive-limit position, performing a first drive in which the movable lens moves to a specified original-restoration start position by being driven a specified distance toward the drive-limit position, performing a second drive in which the movable lens thereafter moves to the original position by being driven toward the original position by a distance equivalent to a distance between the drive-limit position to the original position, and performing a third drive in which the movable lens thereafter moves to a default position by being driven a specified distance.

With this constitution, at the original position and the drive-limit position which define the limits or ends of driving of the movable lens, the first drive is initially performed such that the movable lens is moved toward the drive-limit position in the direction opposite to the original position to reach the original-restoration start position, and restoration to the original position is subsequently performed via the second drive such that the movable lens is moved a specified distance equivalent to the distance from the drive-limit position to the original position, so the movable lens can be reliably restored to the original position by the second drive which moves the movable lens a preset specified distance. That is, restoration to the original position can be performed by simply driving a preset appropriate movement distance, so there is no need to excessively drive the lens driving device. This increases the durability of the components that drive the movable lens which moves back and forth between the specified original position and the drive-limit position, thus providing a method for driving an optical pickup apparatus that makes stable operability possible and that lengthens the lifetime of the optical pickup apparatus.

According to another preferred embodiment of the present invention, a lens driving device for driving a movable lens of an optical pickup apparatus includes a drive motor and a screw shaft that is rotary-driven by the drive motor, the movable lens being attached to a lens holder provided with a nut that is threaded onto the screw shaft, and the drive motor is rotated in forward or reverse directions to move the lens holder in a specified direction. With this constitution, it is possible to suppress to a minimum the number of gear-tooth skipping revolutions that occur at the time of restoration to the original position so as to prevent the screw shaft being driven excessively and the nut skipping gear teeth or rotating while disengaged from the screw shaft. For this reason, a method for driving an optical pickup apparatus according to a preferred embodiment of the present invention improves the durability of components that drive a movable lens that moves back and forth between a specified original position and a drive-limit position and therefore achieves stable operability and lengthen the lifetime of products.

Moreover, a preferred embodiment of the present invention provides a method for driving an optical pickup apparatus constituted as described above, wherein the drive motor is a stepper motor and has specified step numbers respectively corresponding to the default position, the original-restoration start position, and the drive-limit position, with the original position of the lens holder being taken as Step 0, and the step of performing the first drive includes performing a first step-drive in which driving is performed after confirming the step number corresponding to the stopping position of the lens holder in an amount equal to a difference between the step number of the original-restoration start position and the step number of the stopping position, the step of performing the second drive includes performing a second step-drive to drive a number of steps corresponding to the step number of the drive-limit position, and the step of performing the third drive includes performing a third step-drive to drive a number of steps corresponding to the step number of the default position. As a result of the stepper motor being driven the specified numbers of steps, the movable lens can be accurately moved to the original-restoration start position which is spaced away from the original position, restored to the original position at a motor speed that suppresses the number of gear-tooth skipping revolutions down to a specified number, and accurately moved to the specified default position.

In addition, according to another preferred embodiment of the present invention, a lens driving device for driving a movable lens of an optical pickup apparatus having the structure according to a preferred embodiment described above preferably further includes a guide shaft disposed parallel or substantially parallel to a screw shaft and which slidably supports the lens holder, a guide hole through which the guide shaft passes is provided in the lens holder, the lens holder is supported by the two shafts, i.e., the guide shaft and the screw shaft, and the position thereof is defined via a first stopping member at the original position, while the position thereof is defined via a second stopping member at the drive-limit position. With this constitution, the lens holder is supported by the two shafts, i.e., the guide shaft and the screw shaft, so the movable lens can be moved parallel or substantially parallel to the direction of the optical axis by aligning the direction of these shafts to the direction of the optical axis. In addition, the original position and the drive-limit position can be accurately defined via the first stopping member and the second stopping member.

Furthermore, a lens driving device for driving a movable lens of an optical pickup apparatus having the structure according to a preferred embodiment described above preferably further includes small-diameter unthreaded portions provided at both end portions of the screw shaft, and each of the first stopping member and second stopping member includes an urging member such that upon reaching one of the small-diameter portions, the nut engages with the corresponding one of the first stopping member and second stopping member and is urged toward the respective threaded portion. With this constitution, the arrangement is such that gear-tooth skipping occurs in the unthreaded small-diameter portions at the end portions of movement by rotating the screw shaft, and the constitution is also such that there is no driving in excess of that necessary such that wear of the nut can be suppressed to a minimum.

Moreover, it is preferred that the first stopping member includes a leaf spring, and the second stopping member includes a coil spring. With this constitution, because the first stopping member near the drive motor includes a leaf spring, contact between the nut and the drive motor can be reliably suppressed. Furthermore, because the second stopping member includes a coil spring, a constitution is created which is such that the movable lens is moved while being held between the nut and the coil spring at the time of the movement in the direction of the optical axis, which makes smooth and accurate lens movement possible without wobbling or the like.

In addition, it is preferred that the movable lens is a collimating lens, for example, to increase the durability of the components that drive the collimating lens and to provide for stable operability and an increased lifetime of the optical pickup apparatus.

With various preferred embodiments of the present invention, it is possible to obtain a method for driving an optical pickup apparatus which improves the durability of components that drive a movable lens that moves back and forth between an original position and a drive-limit position and which can therefore achieve stable operability and lengthen the lifetime of optical pickup apparatus.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described with reference to drawings. Note that the same symbols are used for the same constituent members, and detailed explanations are omitted as appropriate. First, one example of an optical pickup apparatus will be described with reference to FIG. 1.

Figure 1:
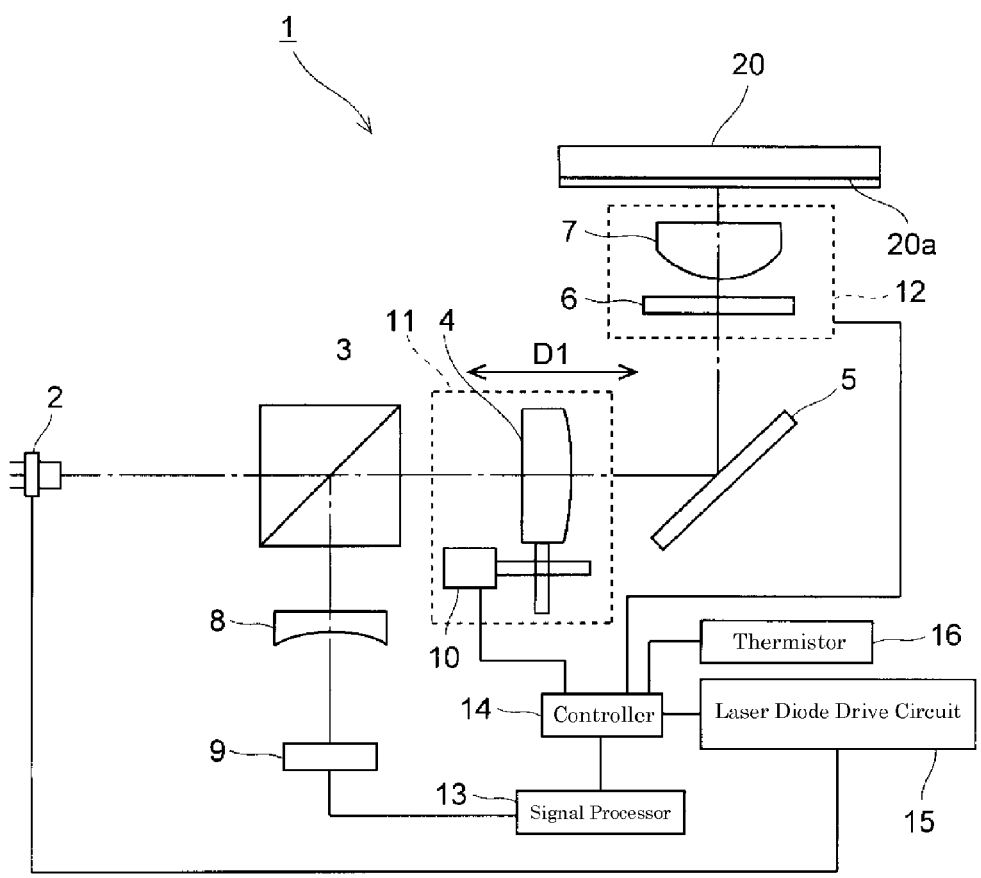
FIG. 1 is a schematic explanatory diagram illustrating one example of an optical pickup apparatus according to a preferred embodiment of the present invention.

The optical pickup apparatus 1 according to the present preferred embodiment is an apparatus that irradiates an optical disc 20 with laser light to record or playback data. The optical pickup apparatus 1 according to the present preferred embodiment preferably includes, for example, a laser diode 2 constituting the light source, a polarizing beam splitter 3, a collimating lens 4, a stand-up mirror 5, a quarter-wave plate 6, an objective lens 7, a cylindrical lens 8, and an optical detector 9 as shown in FIG. 1, and laser light is focused on a recording layer 20a of the optical disc 20 using the objective lens 7.

The laser diode 2 preferably is a semiconductor laser that emits laser light of a specified wavelength, selected to be compatible with the optical disc 20. In addition, although FIG. 1 illustrates an optical pickup apparatus 1 including a single laser diode 2 which is compatible with one type of optical disc 20, it may also be an optical pickup apparatus equipped with a plurality of laser diodes 2 so as to be compatible with a plurality of types of optical discs 20.

The polarizing beam splitter 3 is arranged to receive incident light from two mutually orthogonal directions of polarization and to transmit the light of one of the linear polarizations while reflecting the light of the other linear polarization, thus transmitting the laser light emitted by the laser diode 2 and reflecting the laser light reflected by the optical disc 20 toward the optical detector 9. The optical detector 9 converts the optical information contained in the received laser light into electrical signals.

The collimating lens 4 is arranged to convert incident laser light into collimated light. Furthermore, the collimating lens 4 is also a movable lens that changes luminous flux so as to change the convergence and scattering state of the luminous flux incident upon the objective lens 7, and a spherical aberration compensation mechanism 11, which can adjust the convergence and scattering state of the laser light passing through the collimating lens 4, and includes a drive motor (e.g., a stepper motor 10) that moves the collimating lens 4 in the direction of the optical axis (in the direction of arrow D1).

The stand-up mirror 5 reflects laser light transmitted from the collimating lens 4 toward the optical disc 20. Moreover, the quarter-wave plate 6 is arranged to convert linearly polarized light to circularly polarized light and to convert circularly polarized light to linearly polarized light. Therefore, the quarter-wave plate 6 converts the linearly polarized laser light reflected by the stand-up mirror 5 to circularly polarized light which is incident upon the objective lens 7, and also converts the circularly polarized laser light reflected from the optical disc 20 to linearly polarized light which is incident upon the collimating lens 4 from the stand-up mirror 5.

The objective lens 7 focuses laser light and irradiates the recording layer 20a of the optical disc 20 with the focused laser light], and also receives the laser light reflected from the recording layer 20a and causes the reflected laser light to be incident upon the quarter-wave plate 6.

The objective lens 7 is arranged to focus laser light as a spot on the recording layer 20a of the optical disc 20. It is preferable that the objective lens 7 is a plastic lens, for example, since a plastic lens is lighter than a glass lens, can be mass-produced, and is thus less costly.

In addition, both the objective lens 7 and the quarter-wave plate 6, for example, are mounted upon an actuator so as to be movable in the focusing direction and tracking direction.

The cylindrical lens 8 is arranged to induce an astigmatism in the laser light reflected from the recording layer 20a of the optical disc 20, such that the astigmatism can be used in focus error detection.

The electrical signals output from the optical detector 9 are sent to a signal processor 13. The signal processor is arranged and programmed to process the electrical signals received from the optical detector 9 to generate RF signals, focus error signals (FE signals), tracking error signals (TE signals), and the like, for example. Note that the reading out of information is performed with the RF signals, while focusing control and tracking control are performed based on the FE signals and TE signals.

A controller 14 is arranged and programmed to control the overall operation of the optical pickup apparatus 1. For example, the controller 14 performs the control of a laser diode drive circuit 15, the control of the spherical aberration compensation mechanism 11, the control of the actuator 12, and the like, for example.

In addition, a thermistor 16 is preferably disposed upon the substrate equipped with the laser diode drive circuit such that the optical output of the laser diode 2 is controlled based on temperature information from this thermistor 16. Furthermore, the temperature of the objective lens 7 is determined from the temperature information of the thermistor 16 such that control is exerted so as to compensate for the temperature characteristics of the objective lens 7 in accordance with the temperature obtained.

In order to perform the operation of reading out signals recorded on the laser disc 20 or the operation of recording signals onto the laser disc 20, it is necessary to make the shape of the spots generated by the irradiation of laser light into a favorable state. Moreover, conditions that have deleterious effects on the shape of the spots include aberration such as spherical aberration, astigmatism, and coma aberration, so it is preferable to use a plastic lens which is easily molded into any shape that is desired in order to eliminate the effects of these types of aberrations.

In addition, in order to align the focus of the light beam at the specified recording layer, the FE signals obtained from the light reflected from the optical disc 20 are observed while moving the focus of the light beam emitted from the light source and exiting from the objective lens 7 in the focusing direction by moving the objective lens 7 in the focus direction via the actuator 12, thus performing a focus search that detects the position at which the focus of the light beam coincides with the recording layer 20a of the optical disc 20.

Furthermore, in a multilayer optical disc in which a plurality of recording layers 20a are laminated, spherical aberration is generated due to the distance between the recording layers, so in general when performing servo control on each of the recording layers, spherical aberration compensation that is optimized to each of the surfaces is performed. Specifically, the spherical aberration compensation corresponding to the specified recording layer is performed by moving the collimating lens 4, which is the movable lens to change luminous flux, to a specified position.

After performing the specified spherical aberration compensation, i.e., after moving the collimating lens 4 to the specified position, the objective lens 7 is moved in the focus direction to perform focus servo control to the target recording layer by counting the number of appearances of S-shaped waveforms in the FE signals.

To this end, the position of a movable lens such as the collimating lens 4 included in the optical pickup apparatus 1 is required to be a specified position determined in advance. Specifically, it is preferable for the movable lens to be accurately positioned at a predetermined default position, so at the time that the driving of the optical pickup apparatus is started, the movable lens is moved from the specified original position to the default position by driving a specified number of steps.

Next, a description of a lens driving device that moves a movable lens such as the collimating lens 4 back and forth in the direction of the optical axis will be described with reference to FIG. 2. The lens driving device in the present preferred embodiment is equivalent to the spherical aberration compensation mechanism 11 and shall therefore be described hereafter as the lens driving device 11.

Figure 2:
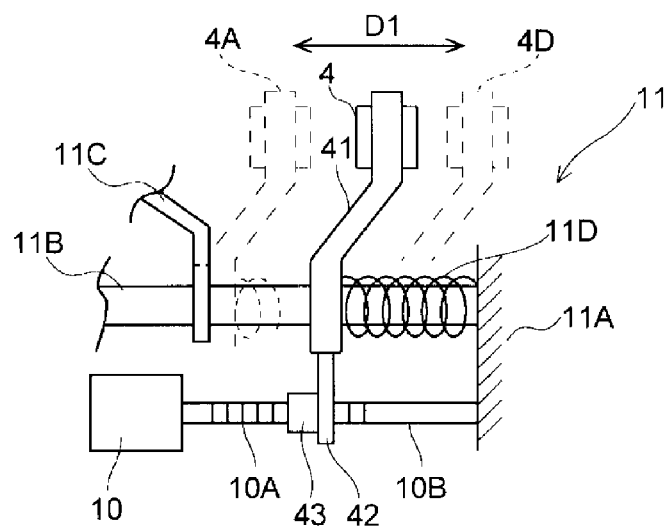
FIG. 2 is a schematic explanatory diagram illustrating one example of a lens driving device provided in an optical pickup apparatus according to a preferred embodiment of the present invention.

As its drive motor, the lens driving device 11 illustrated in FIG. 2 is equipped with a stepper motor 10 mounted to a fixed frame 11A. Moreover, a screw shaft 10A that is rotary-driven via the stepper motor 10 is provided. The movable lens (e.g., collimating lens 4) is mounted to a lens holder 41 provided with a nut 43 that is threaded onto the screw shaft 10A. The nut 43 may be attached to a lower member 42 of the lens holder 41 or a constitution in which it is engaged to and integrated with an indented portion provided on the lens holder 41. In either constitution, the lens holder 41 is arranged to be movable back and forth in the direction of arrow D1 in FIG. 2 via the nut 43 threaded onto the screw shaft 10A.

In addition, the range of back-and-forth movement of the movable lens is determined in advance, so for instance, the original position 4A (the movable lens position indicated by dashed lines in FIG. 2) in close proximity to the drive motor and the drive-limit position 4D (the movable lens position indicated by dashed lines in FIG. 2) away from the drive motor are defined as the ends of movement. The ends of movement can be defined by limiting each end of the range of driving of the drive motor, for example, by limiting the number of drive steps of the stepper motor 10. Furthermore, it is also possible to define the ends of movement by providing sensor members at the stopping positions and controlling the drive motor based on signals detected by the sensor members, and it is also possible to define the ends of movement by providing stopping members at the stopping positions to forcibly stop movement via these stopping members. Moreover, it is also possible to use the stopping members additionally by the number of drive steps, and the use of such a constitution makes stopping possible in a more accurate manner and is therefore preferable.

For example, in the present preferred embodiment, a first stopping member 11C preferably is provided on the side of the original position away from the optical disc, while a second stopping member 11D preferably is provided on the side of the drive-limit position near the optical disc.

In the case of providing such stopping members 11C and 11D, it is preferable that small-diameter unthreaded portions 10B be provided at both end portions of the screw shaft 10A, that each of the first stopping member 11C and second stopping member 11D include an urging member, that upon reaching one of the small-diameter unthreaded portions 10B, the nut 43 be stopped by engaging with the corresponding one of the first stopping member 11C and second stopping member 11D, and that each be urged toward the threaded portion. With such a constitution, even with a constitution in which the nut 43 is stopped against the rotating screw shaft 10A, the screw shaft 10A will rotate in an unengaged state, thus causing with gear-teeth skipping, because the nut 43 will be positioned at one of the small-diameter unthreaded portions 10B. In addition, because the number of gear-tooth skipping revolutions is defined to be a low number of revolutions, the constitution is such that rotary driving is not performed any more than necessary, so the occurrence of noise and wearing of the nut 43 can be prevent and suppressed to a minimum.

Furthermore, a guide shaft 11B that slidably supports the lens holder 41 is preferably arranged parallel or substantially parallel to the screw shaft 10A such that the lens holder 41 can move along these two shafts in parallel or substantially in parallel. Specifically, the lens holder 41 is provided with a hole through which the screw shaft 10A passes and a guide hole through which the guide shaft 11B passes. With such a constitution, the lens holder 41 is supported by the two shafts, i.e., the guide shaft 11B and the screw shaft 10A, and can therefore move parallel or substantially parallel to the directions of these shafts, so by aligning the direction of these shafts to the direction of the optical axis, the parallel or substantially parallel movement of the movable lens becomes possible along the direction of the optical axis. Moreover, the lens holder 41 can be accurately stopped at the original position and the drive-limit position via the first stopping member 11C and the second stopping member 11D.

For example, the first stopping member 11C provided on the side of the original position preferably includes a leaf spring, and the second stopping member 11D provided on side of the drive-limit position preferably includes a coil spring. With such a constitution, because the first stopping member 11C near the drive motor includes a leaf spring, it is possible to reliably prevent contact between the nut 43 and the drive motor. Furthermore, the second stopping member 11D includes a coil spring, which gives a constitution such that when the movable lens is moved in the direction of the optical axis, the movable lens is moved while being held between the nut 43 and the coil spring, which in turn makes smooth and accurate lens movement possible without wobbling or the like.

As was described above, if the constitution is such that a position is defined via the first stopping member 11C at the original position and a position is defined via the second stopping member 11D at the drive-limit position, then because the lens holder is supported by the two shafts, i.e., the guide shaft 11B and the screw shaft 10A, the movable lens can be moved parallel or substantially parallel to the direction of the optical axis by aligning the direction of these shafts to the direction of the optical axis. In addition, the original position and the drive-limit position can be accurately defined via the first stopping member 11C and the second stopping member 11D.

Furthermore, it is preferable that at the time of the start of driving of the optical pickup apparatus 1, the optical pickup apparatus 1 be in the specified default position defined in advance. Therefore, in the present preferred embodiment, a default position is provided at a position moved slightly away from the original position in the direction of the optical axis. Moreover, an original-restoration start position is provided at a specified point just before the drive-limit position.

To this end, when the driving of the optical pickup apparatus is started, the specified operation is executed, and the movable lens (collimating lens 4) is moved to the default position and enters the standby state. In addition, the specified operation is not the conventional scheme in which the movable lens is moved from the initial stopping position directly toward the original position, but rather, it is first moved toward the drive-limit position, in the opposite direction from the original position, and after moving to the specified original-restoration start position, it is then moved to the original position and further moved from the original position to the default position.

That is, the optical pickup apparatus driving method according to the present preferred embodiment is a driving method, wherein the movable lens is constituted so as to be movable back and forth between the original position and the drive-limit position, and the movable lens is subject to a first drive in which the movable lens moves to the original-restoration start position by being driven a specified distance toward the drive-limit position, a second drive in which the movable lens thereafter moves to the original position by being driven toward the original position a distance equivalent to a distance between the drive-limit position to the original position, and a third drive in which the movable lens thereafter moves to the default position by being driven a specified distance.

This driving method will be further described with reference to FIG. 3. The optical pickup apparatus according to the present preferred embodiment is constituted so as to be able to move from the original position 4A to the drive-limit position 4D in a reciprocating manner. The step number of the stepper motor (which may make one full rotation in 20 steps, for example) at the original position 4A is Step 0, for instance, and the step number of the stepper motor at the drive-limit position 4D may be Step 560, for example.

First, upon confirming a stopping position P1 of the movable lens and recognizing that the step number of the stepper motor is Step 100, a first drive is performed to move from the initial stopping position 4B toward the original-restoration start position 4C. If the original-restoration start position 4C is predefined to be at Step 500, then this first drive is the first step-drive ST1 in which the driving is performed from Step 100 to Step 500, i.e., 400 steps.

With the first step-drive ST1, the movable lens reaches a stopping position P2. The stopping position P2 is equivalent to the original-restoration start position 4C. Next, a second drive is performed to move the movable lens located at the stopping position P2 (original-restoration start position 4C) toward the original position 4A. This second drive is the second step-drive ST2 in which the driving is performed a number of steps corresponding to the step number of the drive-limit position. If the original-restoration start position 4C is at Step 500, and the drive-limit position 4D is at Step 560, then this second step-drive ST2 is preferably a drive of 560 steps, for example.

Naturally, one would assume that the movable lens located at the original-restoration start position 4C would be restored to the original position by step-driving the motor 500 steps, but in the case of excessive driving in the first step-drive ST1, it is conceivable that the drive-limit position 4D could also have been reached, so it is preferable that the second step-drive ST2 be one which drives the motor a number of steps corresponding to the step number of the drive-limit position. Moreover, considering the driving margin at the end of movement, in the present preferred embodiment, the second step-drive ST2 is defined to be a drive of 590 steps, which is longer than the 560 steps to the drive-limit position.

This is to make sure that the first step-drive ST1 restores the movable lens to the original position 4A even if it had been moved to the drive-limit position 4D. Therefore, step driving of at least 560 steps equivalent to the step number of the drive-limit position is preferable. In addition, a number of gear-tooth skipping revolutions for the nut 43 of an amount that does not worsen the product life is permitted, so there is no problem with the motor 10 being driven within the nut 43 an excess number of steps equivalent to one to two rotations. Thus, in the present preferred embodiment, a second step-drive ST2 is preferably adopted such that the motor 10 is driven 590 steps, which includes 30 steps equivalent to 1.5 rotations within the nut 43.

That is, the stepper motor driving domain is from Step 0 to Step 590, so the driving domain is somewhat longer than the 560 steps to the drive-limit position. For this reason, upon reaching the drive-limit position 4D at Step 560, the nut 43 is halted in the gear tooth-skipping state for 30 steps while positioned at the small-diameter unthreaded portion 10B and being urged by the second stopping member 11D including a coil spring. This number of gear tooth-skipping revolutions is equivalent to 1.5 rotations in the case of a stepper motor that takes 20 steps to make one rotation.

Thus, when the drive-limit position 4D is at Step 560, even a second step-drive involving driving of 590 steps, which is a longer distance than that, is a step-drive involving driving of a specified number of steps corresponding to the number of gear tooth-skipping revolutions permitted in advance being added to the number of steps to the drive-limit position. Therefore, this is still a step-drive that is based on the step number of the drive-limit position, and one can say that this second step-drive ST2 is a step-drive in accordance with the step number of the drive-limit position.

With this second step-drive ST2, the movable lens reaches a stopping position P3. This stopping position P3 is equivalent to the original position 4A. Next, a third drive is performed to move the movable lens that has reached the stopping position P3 (original position 4A) toward a default position P4 which is a spaced away from the stopping position P3. This third drive is the third step-drive ST3 involving driving a number of steps from Step 0 to the default position.

Figure 3:
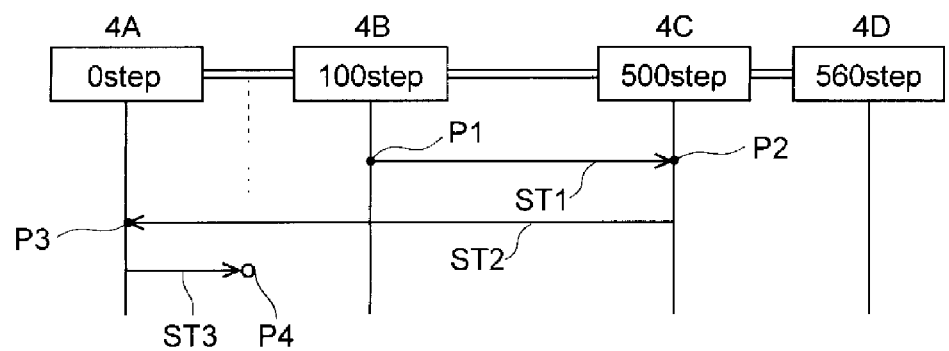
FIG. 3 is a schematic explanatory diagram illustrating one example of a method for driving an optical pickup apparatus according to a preferred embodiment of the present invention.
Figure 4:
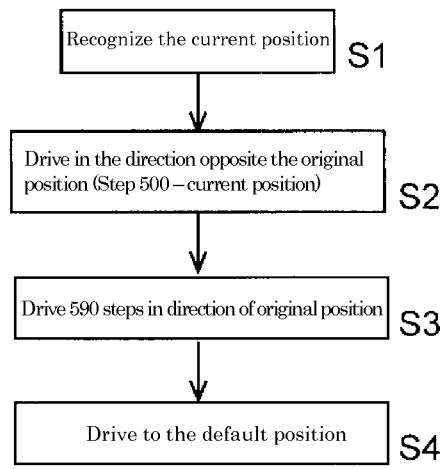
FIG. 4 is a flowchart illustrating the operating procedure in the driving method according to a preferred embodiment of the present invention.

FIG. 4 is a depiction as a block diagram of the driving method illustrated in FIG. 3. As is shown in FIG. 4, the method for driving an optical pickup apparatus according to the present preferred embodiment is as follows. In Step S1, the current position is recognized; using the recognized current position (e.g., the number of steps of the stepper motor), in Step S2, driving (first step-drive) is performed in the direction opposite to the original position (500 steps minus the number of steps to the current position); in Step S3, driving (second step-drive) is performed for a specified distance, e.g. 590 steps, in the direction of the original position; and in Step S4, driving (third step-drive) is performed to the default position.

Figure 5:
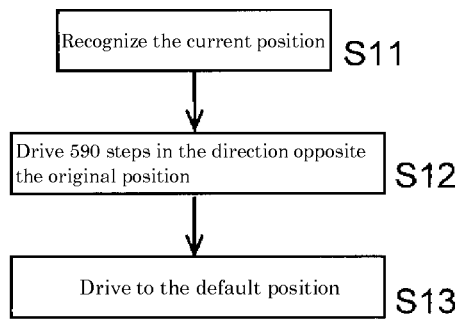
FIG. 5 is a flowchart illustrating the operating procedure in a conventional driving method.

In the conventional driving method, as is shown in FIG. 5, for example, after the current position is recognized (Step S11), driving is performed for a specified number of steps (e.g., 590 steps) in the direction toward the original (Step S12), and the movable lens is then moved from there to the default position (Step S13).

Thus, the conventional method is designed such that, regardless of the current position of the movable lens, the drive motor is always driven the number of steps to return to the original position no matter where it is in order to return the movable lens to the original position. For this reason, the number of gear tooth-skipping revolutions of the nut ends up being large depending on the initial position of the movable lens, so the nut made of plastic wears faster.

However, with the driving method according to the present preferred embodiment, after initially moving in the direction opposite the original position, restoration to the original position is performed by moving a specified distance from a specified original-restoration start position; for example, the movable lens 4 which is located at the original-restoration start position P2 at Step 500 is driven 590 steps toward the original point P0. In this case, the number of gear tooth-skipping revolutions is no more than that equivalent to 90 steps. If one full rotation of the motor is 20 steps, for example, 90 steps is the same as 4.5 rotations.

Therefore, if a movable lens that is located at Step 100, for example, is returned to the original position with the conventional method, the number of gear tooth-skipping revolutions becomes (590-100)/20=approximately 25 rotations. However, with the method of a preferred embodiment of the present invention, the number of gear tooth-skipping revolutions is 4.5 rotations at most, so it is possible to suppress the number of gear tooth-skipping revolutions to a low value.

As was described above, with the driving method according to the present preferred embodiment, at the original position and the drive-limit position which are the ends of driving of the movable lens, the first drive is initially performed which moves the movable lens toward the drive-limit position in the direction opposite to the original position, and thereafter restoration to the original position is performed via the second drive which moves the movable lens for a specified distance equivalent to the distance from the drive-limit position to the original position. Therefore, it is possible to suppress to a minimum the number of gear-tooth skipping revolutions of the nut with respect to the screw shaft caused by excessive driving of the screw shaft at the time of restoration to the original position. This increases the durability of the components that drive the movable lens which moves back and forth between the specified original position and the drive-limit position, thus providing a method for driving an optical pickup apparatus that makes stable operability possible and that can lengthen the lifetime of the optical pickup apparatus and is therefore preferable.

In addition, if the movable lens is a collimating lens, the durability of the components that drive the collimating lens can be increased, thus making it possible to lengthen the lifetime of the collimating lens and also making it possible to exhibit stable operability.

Thus, preferred embodiments of the present invention provide a method for driving an optical pickup apparatus that enables stable operability and lengthens the lifetime of the optical pickup apparatus by improving the durability of components that drive a movable lens that moves back and forth between a specified original position and a drive-limit position.

Accordingly, the method for driving an optical pickup apparatus according to preferred embodiments of the present invention can be suitably applied to an optical pickup apparatus in which stable operability and stable product lifetime are required.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for driving an optical pickup apparatus that irradiates an optical disc with laser light to record or playback data while compensating for spherical aberration by moving a movable lens in a direction along an optical axis to change a luminous flux provided within an optical path between a laser diode and an objective lens, the optical pickup apparatus including a lens driving device arranged to move the movable lens back and forth between an original position and a drive-limit position, the method comprising the steps of:
    performing a first drive in which the movable lens moves to an original-restoration start position by being driven a specified distance toward the drive-limit position;
    performing a second drive in which the movable lens thereafter moves to the original position by being driven toward the original position a distance equivalent to a distance between the drive-limit position and the original position; and performing a third drive in which the movable lens thereafter moves to a default position by being driven a specified distance.

2. The method for driving an optical pickup apparatus according to claim 1, wherein the lens driving device includes a drive motor and a screw shaft that is rotary-driven by the drive motor, the movable lens is attached to a lens holder including a nut that is threaded onto the screw shaft, and the method further comprises the step of rotating the drive motor in a forward direction or a reverse direction to move the lens holder in a specified direction.

3. The method for driving an optical pickup apparatus according to claim 2, wherein the drive motor is a stepper motor and has specified step numbers respectively corresponding to the default position, the original-restoration start position, and the drive-limit position, with the original position of the lens holder being taken as Step 0, and the step of performing the first drive includes performing a first step-drive in which driving is performed after confirming the step number corresponding to a stopping position of the lens holder in an amount equal to a difference between the step number of the original-restoration start position and the step number of the stopping position, the step of performing the second drive includes performing a second step-drive by driving a number of steps corresponding to the step number of the drive-limit position, and the step of performing the third drive includes performing a third step-drive by driving a number of steps corresponding to the step number of the default position.

4. The method for driving an optical pickup apparatus according to claim 2, wherein a guide shaft is provided and disposed parallel or substantially parallel to the screw shaft so as to slidably support the lens holder, a guide hole through which the guide shaft passes is provided in the lens holder, the lens holder is supported by the guide shaft and the screw shaft, and a position of the lens holder is defined by a first stopping member at the original position and by a second stopping member at the drive-limit position.

5. The method for driving an optical pickup apparatus according to claim 4, wherein small-diameter unthreaded portions are provided at both end portions of the screw shaft, and each of the first stopping member and second stopping member includes an urging member such that upon reaching one of the small-diameter portions, the nut engages with the corresponding one of the first stopping member and second stopping member and is urged toward the respective threaded portion.

6. The method for driving an optical pickup apparatus according to claim 4, wherein the first stopping member includes a leaf spring, and the second stopping member includes a coil spring.

7. The method for driving an optical pickup apparatus according to claim 1, wherein the movable lens is a collimating lens.

* * * * *